Aug. 30, 1955  A. W. WAY  2,716,489
APPARATUS FOR SEPARATING SOLIDS FROM A LIQUID BODY
Original Filed May 7, 1946  3 Sheets-Sheet 1
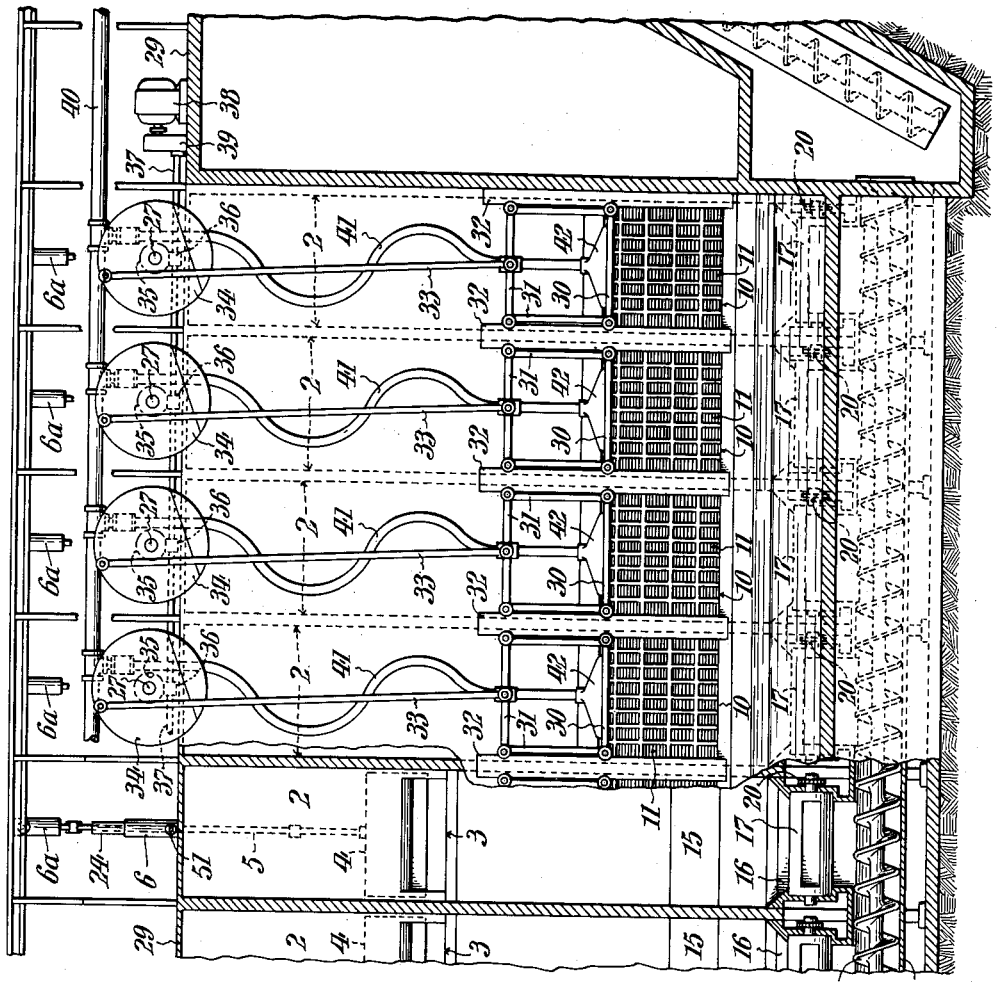
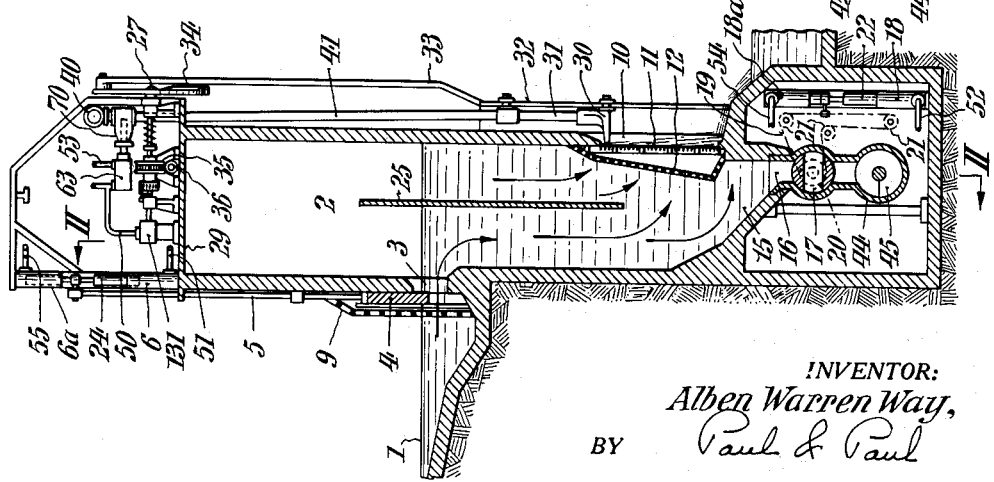
INVENTOR:
Alben Warren Way,
BY Paul & Paul
ATTORNEYS.

Aug. 30, 1955  A. W. WAY  2,716,489
APPARATUS FOR SEPARATING SOLIDS FROM A LIQUID BODY
Original Filed May 7, 1946  3 Sheets-Sheet 2
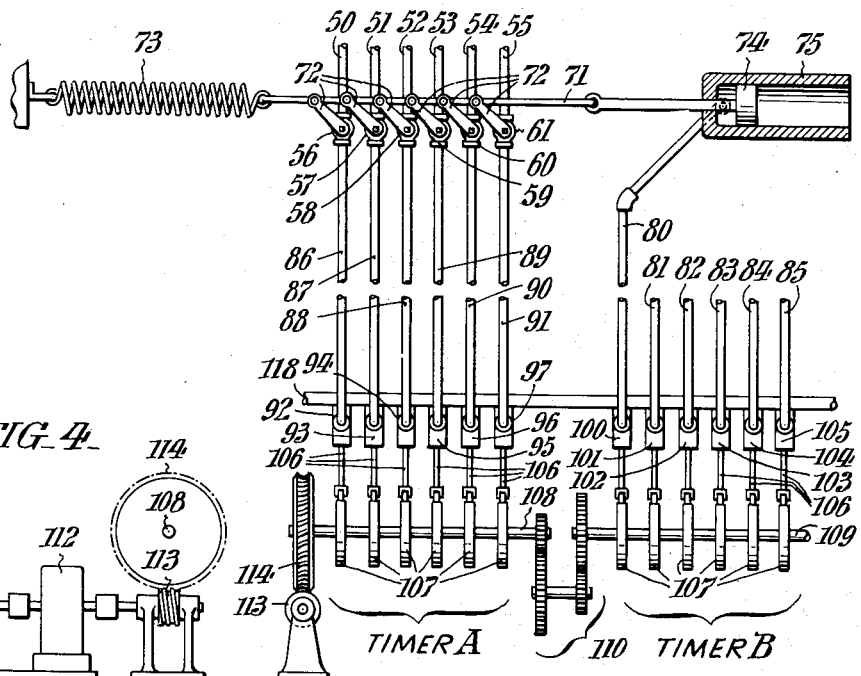
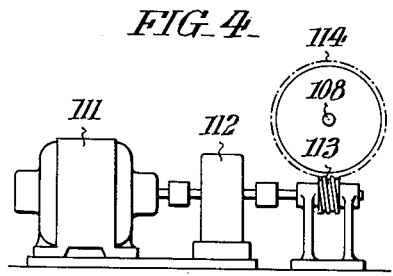
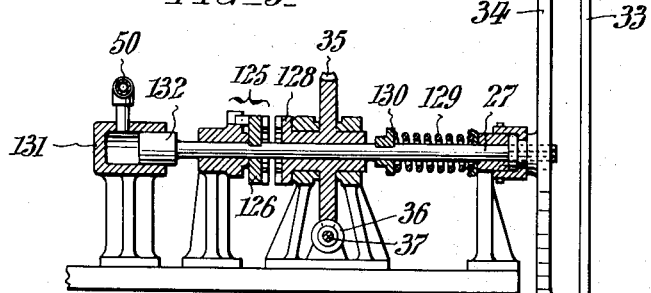
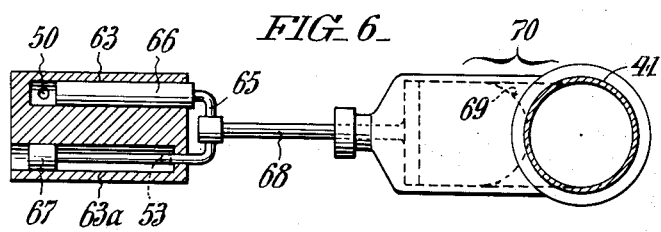
INVENTOR:
Alben Warren Way,
BY Paul & Paul
ATTORNEYS.

Aug. 30, 1955     A. W. WAY     2,716,489
APPARATUS FOR SEPARATING SOLIDS FROM A LIQUID BODY
Original Filed May 7, 1946     3 Sheets-Sheet 3
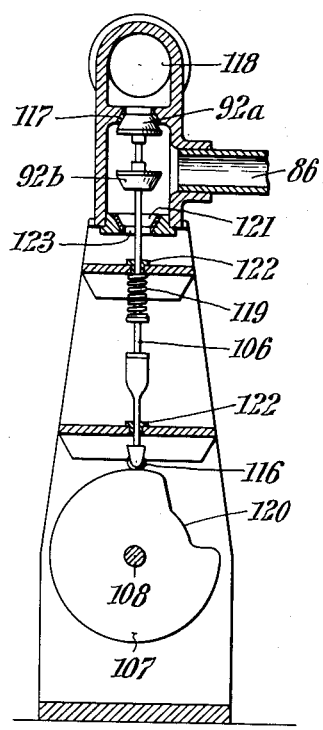
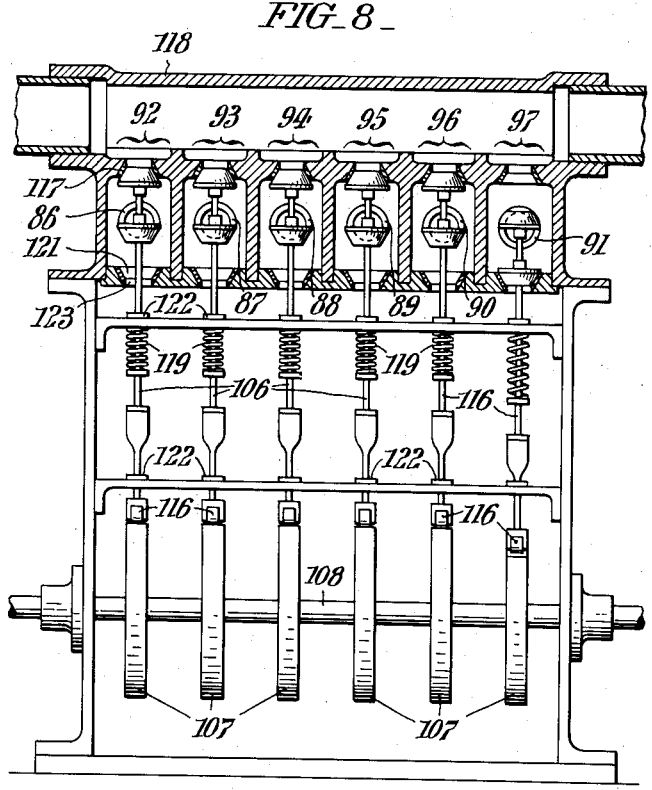
INVENTOR:
Alben Warren Way,
BY Paul & Paul
ATTORNEYS.

United States Patent Office 2,716,489
Patented Aug. 30, 1955

2,716,489

APPARATUS FOR SEPARATING SOLIDS FROM A LIQUID BODY

Alben Warren Way, Philadelphia, Pa.

Original application May 7, 1946, Serial No. 667,937, now Patent No. 2,586,447, dated February 19, 1952. Divided and this application November 8, 1951, Serial No. 255,342

3 Claims. (Cl. 210—43)

This invention relates to apparatus for separating solids from a liquid body and is especially useful in its application to the removal of solid matter from flowing streams of water. In a previously filed application for Letters Patent, Serial No. 624,144, filed October 24, 1945, in the name of John William Morton and myself, now U. S. Patent No. 2,603,354, granted July 15, 1952, there is disclosed and claimed a process of thickening concentrate derived from a solids-laden stream, and apparatus for carrying out the process. The present invention constitutes an improvement which pertains to the same field of invention, and in its broader aspects has useful application not only to the removal of solids from a natural solids-laden stream, but also from industrial plant waste discharge, from mine discharge, from dredge discharge and from various other sources.

Where the solids content of a flowing stream, for example, coal, silt, fines, or the refuse of industrial plant discharge is fairly constant, or varies within a narrow range, it is desirable to employ a process of separation using a "time cycle," either for automatic control or as a guide towards efficient manual control, so that the various operations involved may take place in proper sequence and at proper intervals predetermined according to the percentage of solids to liquid, or the range within which such percentage may vary.

On the other hand, where the solids content of a stream, or other source, varies greatly, it is desirable to employ a process using a "test cycle" in which frequent tests are performed to determine density, and the successive operations of the separating apparatus are gauged or timed according to the fluctuations in density which are periodically encountered. The test cycle is disclosed and claimed in a parent application which bears the Serial No. 667,937, filed May 7, 1946, of which this application is a division. The aforesaid parent application has now matured into U. S. Patent 2,586,447, granted February 19, 1952.

Accordingly the object of the present invention is to provide apparatus which will meet the problems involved under either of the conditions mentioned above. More specifically, in the apparatus of this invention provision is made for effecting a series of mechanical movements to admit batches of a solids-laden liquid body to a thickening chamber wherein a concentrate is formed by gradual accretion of solids, to discharge such concentrate from the thickening chamber in successive batches, and to permit the outflow of liquid, substantially free of solids from said chamber, with such movements performed in the desired sequence and properly timed so as to maintain maximum efficiency and maximum production of concentrate.

The invention further comprehends various appliances which make possible a fully automatic control of all of the above mentioned mechanical movements involved in the separation process.

Other more specific objects and advantages characteristic of the present invention are set forth more fully in the description of certain practical embodiments of the invention which follows hereinafter and has reference to the accompanying drawings, whereof:

Fig. 1 is a vertical cross-sectional view of a thickening chamber and accompanying parts suitable for the practice of the invention according to the "time cycle" principle;

Fig. 2 is a rear elevation of a series of such thickening chambers, partly in section, as indicated by the arrows II—II in Fig. 1;

Fig. 3 is a diagrammatic representation of the timing mechanism and other apparatus used for remotely and automatically controlling the mechanical movements performed at each separating chamber;

Fig. 4 shows the motor and associated speed reducer and regulator for driving the timing mechanism;

Fig. 5 shows in detail, partly in elevation and partly in section, the apparatus for controlling vertical motion of each back washing nozzle;

Fig. 6 shows in detail the apparatus for controlling the supply of water to each back washing nozzle; and Figs. 7 and 8 show in cross section and in side elevation, partly in section, details of one of the timing devices shown in Fig. 3.

In the accompanying drawings, with special reference to Figs. 1 and 2, a body of solids-laden water is shown at 1. It may be assumed that the body of water is derived from a natural stream, or is discharged from an industrial plant, or comes from any other source. A thickening chamber is represented at 2. The solids-laden water enters the chamber 2 through an opening 3 in the region of its upper end, and discharges substantially free of solids through a screen 11 located near the bottom of the chamber. Admission of water into the chamber 2 is controlled by a gate 4 in the opening 3, which is moved up and down by a rod 5, the reciprocation of which is accomplished by a double piston 24 operated by opposed pressure cylinders 6, 6a controlled remotely and automatically as hereinafter described by pressure lines 51 and 55 which cause the gate 4 to be opened and closed at the proper time and for the desired intervals. As the capacity of the intake gate 4 is greater than that of the screen 11, the solids-laden liquid fills the chamber 2 to approximately the level of water in the entrance channel. To prevent the entrance into the chamber 2 of unduly large solids, a coarse screen 9 guards the inflow of the stream on the outside of the gate.

A frame for the screen 11 is formed at the outlet 10 of the chamber 2. It may be assumed that the screen 11 is so constructed that notwithstanding its fineness it is capable of resisting the pressure to which it is subjected. A protecting screen 12 of relatively coarse mesh is disposed at the inside of the settling chamber to prevent large solids from being carried against the fine screen 11. At its base the chamber 2 is desirably in the shape of a funnel forming a sump 15 having an exit 16 along its bottom controlled by a valve 17, the opening and closing of which is accomplished by opposed pressure cylinders 18, 18a having a double piston 22 attached to an endless chain 19, trained around idler sprockets 21 and also around a sprocket 20 which operates the valve 17. The pressure cylinders 18, 18a are operated automatically and by remote control, as hereinafter described, by pressure lines 52 and 54.

A baffle plate 25 is mounted more or less centrally in the thickening chamber 2. It extends downwardly far enough to prevent direct impact of the incoming stream against the filtering means at the outlet 10, and causes the flow to take a general horizontal direction as it approaches the outlet. On the outside of the outlet 10 there is a nozzle 30 extending across the width of the screen 11 and capable of projecting a jet of water under considerable pressure against the screen from the outside, the purpose of the jet being to keep the inner surface and meshes of the screen clean by forcing therefrom any accumulation of solid matter which may tend to clog the screen. The nozzle 30 is fixed on a framelike structure 31 guided for up and down movement by guides 32 on the rear wall of the chamber 2 and reciprocated by a crank disk 34 with which the structure 31 is connected by a rod 33. The shaft 27 of the crank disk 34 has a worm gear 35 driven by a worm 36 on a shaft 37. The shaft 37 is operated by a motor 38 through reduction gearing 39 located upon the working platform 29.

Each nozzle 30 is supplied by a water line 40 from which proceed branches, each having a flexible or extensible component 41 and a spreading end 42. Flow of water under pressure through the nozzles 30 is controlled remotely and automatically by mechanism which is hereinafter described.

Below the valve 17 which controls the bottom outlet 16 an elongated conduit 44 is provided within which operates a screw conveyer 45 which by continual rotation carries with it to a desired point of discharge all of the concentrate produced in and removed from the thickening chamber 2.

The description thus far has been directed to a single thickening chamber, but it is to be understood that it is generally desirable to provide a series of separate chambers placed in juxtaposition to each other and having their inlets and outlets at a common level. Mechanism for performing the various operations for opening and closing the intake gate 4, for effecting the vertical movement of the nozzles 30, for controlling the jet of water from the nozzles 30, and for opening and closing the valve 17 is duplicated at each chamber in the series.

As shown in Fig. 3 the means for controlling the various operations at each chamber 2 in the illustrated example of the invention constitute a number of pressure lines 50 to 55 leading to each instrumentality at the particular chamber the operation of which is to be controlled, the flow of pressure fluid at each chamber being governed by a corresponding number of shut-off valves 56 to 61.

Pressure lines 51 and 55 lead to the cylinders 6 and 6a respectively and control reciprocation of the double piston 24, shown in Figs. 1 and 2, which is connected to the rod 5 and which moves the intake gate 4 to open or closed position, depending upon whether pressure is applied to cylinder 6 or cylinder 6a.

Pressure lines 52 and 54 lead to the cylinders 18 and 18a respectively and control reciprocation of the double piston 22, shown in Fig. 1, which is connected to the endless chain 19 and which causes the discharge valve 17 to be opened or closed, depending upon whether pressure is applied to cylinder 18 or cylinder 18a.

Pressure lines 50 and 53 lead to cylinders 63 and 63a respectively, shown in Fig. 6, and control movement of a yoke 65 connected to pistons 66 and 67 moving in cylinders 63 and 63a. The yoke 65 is in turn connected to a valve rod 68 which operates the gate 69 of a cut-off valve 70 controlling the supply of water to the hose 41 and thence to each nozzle 30.

In practice it is desirable to add to the control devices mentioned above certain safety features to insure against various failures or improper operation of the valves associated with the chamber 2 but such safety features form no part of the present invention and hence are not shown.

With further reference to Fig. 3, the shut-off valves 56 to 61 are simultaneously operated by means of a connecting rod 71 having links 72 leading to each such valve. It will be understood that all of the valves 56 to 61 are opened or closed together, and that whenever pressure is admitted to one cylinder, such as cylinder 6, its companion cylinder 6a is exhausted. Where air under pressure is used as the pressure medium such exhaust may be to the atmosphere. A spring 73 urges movement of the connecting rod 71 to the left as viewed in Fig. 3. A piston 74 movable within a cylinder 75 urges the connecting rod 71 in the opposite direction when pressure is admitted to the cylinder 75 through pipe 80. Desirably the shut-off valves 56 to 61 are located near the chamber the functions of which they control, and in close proximity to each other. They may be situated at the working platform 29. Although only one set of shut-off valves has been shown in the drawings, this set consisting of six valves associated with one chamber, it will be understood that a similar set of valves will be provided for each thickening chamber 2 that is employed. Upon the assumption that six chambers constitute a convenient number for a section of a separating plant, six connections are illustrated at 80 to 85, but only the apparatus associated with one connection, that shown at 80, is illustrated in the drawings.

The flow of pressure fluid to shut-off valves 56 to 61 through pipes 86 to 91 is controlled by timing valves 92 to 97. Similarly the flow of pressure fluid through pipes 80 to 85 is controlled by timing valves 100 to 105. Each timing valve 92–97, 100–105 is connected to a source of pressure and has a valve rod 106 governing opening or closure actuated by a cam 107.

One group of six cams 107 is mounted upon a shaft 108 which is caused to revolve at a constant speed, and the other group of six cams is mounted upon an additional shaft 109 connected to shaft 108 by reduction gearing 110. As shown in Fig. 4 shafts 108, 109 are driven by a constant speed electric motor 111 through a speed change and regulating mechanism 112, a worm 113 and a worm gear 114 mounted upon shaft 108. Each cam 107 may take a form such as illustrated in Fig. 7. When the roller 116, see Figs. 7 and 8, at the lower end of the valve rod 106 engages the raised cylindrical surface of the cam disc 107 the timing valve 92a is maintained in the raised position against valve seat 117 shutting off the flow of pressure fluid from pipe 118, which leads to the source of pressure, to pipe 86. On the other hand, when the roller 116, urged downward by a spring 119 and guided by sleeves 122, engages the depressed surface 120 of cam 107, valve 92a is withdrawn from valve seat 117 and valve 92b is lodged against valve seat 121. Flow is then permitted from pipe 118 to pipe 86. Valve 92b when raised from its seat 121 permits an exhaust from pipe 86 to the atmosphere through port 123. The set of six cams 107 mounted on shaft 109 is preferably caused to rotate at one-sixth of the speed of rotation of shaft 108, this being accomplished by use of reduction gearing establishing a 6 to 1 ratio between shafts 108 and 109. The shaft 108 and the cams 107 associated therewith are comprehensively designated as timer A and the slower moving shaft 109 and associated cams are deisgnated as timer B. If it be assumed that timer A operates at a speed of one revolution in five minutes and timer B operates at a speed of one revolution in thirty minutes, it will be apparent that the cams may be so constructed and arranged with respect to each other that the sequence of operations at each chamber may be staggered at five minute intervals so that when any one chamber is discharging its concentrate with its intake gate 4 closed, the five other chambers of the section will be actively accumulating solids by the thickening process. It will be also apparent that the cams 107 of timer A are so arranged and constructed that when one cylinder of a pair, such as cylinder 6, is under pressure the opposed cylinder 6a will exhaust to the atmosphere.

In Fig. 5, there is shown a device for effecting intermittent movement of the back washing nozzles 30 so that reciprocation of each nozzle is suspended during the period in which the water supply to the nozzle is cut off. This apparatus comprises a clutch 125 having one element 126 keyed to the shaft 27 which drives the crank disc 34 and having a clutch face 128 affixed to the driven worm gear 35 which is mounted to turn freely upon the shaft 27. The clutch 125 is normally disengaged and held out of action by a spring 129 bearing against a collar 130 keyed to shaft 27, but when water is turned on at the nozzle 30 pressure from line 50, which is the control line governing water supply to the nozzle, is admitted to a cylinder 131. Shaft 27 has an enlarged end 132 fitting within cylinder 131 and serving as a piston. Accordingly under the influence of pressure within the cylinder 131 shaft 27 moves to the right, as viewed in Fig. 5 causing clutch element 126 to engage clutch face 128 so that shaft 27 is caused to rotate. When pressure in the cylinder 131 is relieved the clutch 125 will be disengaged under the influence of spring 129 and rotary movement of the crank disc 34 will cease.

While I have described my invention in considerable detail showing one specific embodiment and the particular mechanism for controlling all of the operations at a separating chamber, it will be apparent that numerous changes may be made in the form of the apparatus herein described and illustrated, and that certain features of the invention may at times be used to advantage without a corresponding use of other features, all without departing from the spirit of the invention as defined in the annexed claims. It should also be understood that although the apparatus of this invention is referred to as "apparatus for separating solids from a liquid," I do not wish to imply that the concentrate as discharged from the thickening chamber is free of liquid, but rather that the ratio of liquids to solids therein has been reduced to the point where the solid matter is readily recoverable.

Having thus described my invention, I claim:

1. In apparatus for separating solids from a liquid including a screened retention chamber wherein a substantially homogeneous concentrate is formed by gradual accumulation of finely divided solids, valve means for controlling the admission of successive batches of solids-laden liquid into said chamber and the discharge of the concentrate therefrom in successive batches, a screen permitting the flow of liquid while preventing the flow of solid matter from said chamber, a nozzle projecting water against the outflow of said screen to prevent its clogging, said nozzle being movable across said screen, and means including a timing device for actuating said valve means, for supplying pressure to said nozzle and for moving said nozzle across said screen, said timing device including control means for closing said admission valve means and opening said discharge valve means, and said timing device also including a timing element for stopping the movement of said nozzle across the screen when the discharge valve means is open, said timing device also including means for repeating this sequence at predetermined intervals.

2. In apparatus for separating solids from a liquid including a screened retention chamber wherein a substantially homogeneous concentrate is formed by gradual accumulation of finely divided solids and having a filter for the outflow of water substantially free of solids, a movable jet for projecting a fluid stream against the outside of said filter to prevent clogging thereof, control means having an element governing the admission of solids-laden liquid into said chamber and an element governing the movement of said jet and the supply of fluid thereto, and a timing device for actuating the element of said control means, said timing device including a first timing element connected to said control means for closing off the admission of said solids-laden liquid into said chamber, and said timing means also including another second timing element operable in predetermined fixed relation to said first timing element and connected to said control means to shut off the fluid supply to said jet and stop the movement of said jet when the solids-laden fluid is cut off from said chamber.

3. In apparatus for separating finely divided solids from solids-laden liquid, including a series of independent solids retention chambers wherein a substantially homogeneous concentrate is formed by gradual accumulation of finely divided solids therein, each chamber having an inlet conduit for solids-laden liquid, said chamber also having a screened outlet opening for clarified liquid, and an outlet conduit for concentrate, mechanical flow interrupting means coacting with each chamber for opening and closing the inlet conduits and concentrate discharge conduits of the chambers, and a timing device operatively connected to said flow interrupting means for actuating the opening and closing of the aforesaid conduits in interdependent relation according to a definite sequence and at predetermined intervals, said timing device including means whereby one or more of the chambers will be actively engaged in a solids-retaining process while one or more other chambers will be in the process of discharging concentrate with the inlet conduit closed.

References Cited in the file of this patent

UNITED STATES PATENTS

| | | |
|---|---|---|
| 1,357,499 | Hunt | Nov. 2, 1920 |
| 1,547,955 | Price | July 28, 1925 |
| 1,591,821 | Heaton | July 6, 1926 |
| 1,768,314 | Folta | June 24, 1930 |
| 2,035,592 | Christensen | Mar. 31, 1936 |
| 2,090,637 | Paige | Aug. 24, 1937 |
| 2,586,447 | Way | Feb. 19, 1952 |